Nov. 20, 1934.  G. SCHNEIDER  1,981,472
APPARATUS FOR MAKING FILMS, FOILS, AND THE LIKE
Filed Jan. 28, 1930
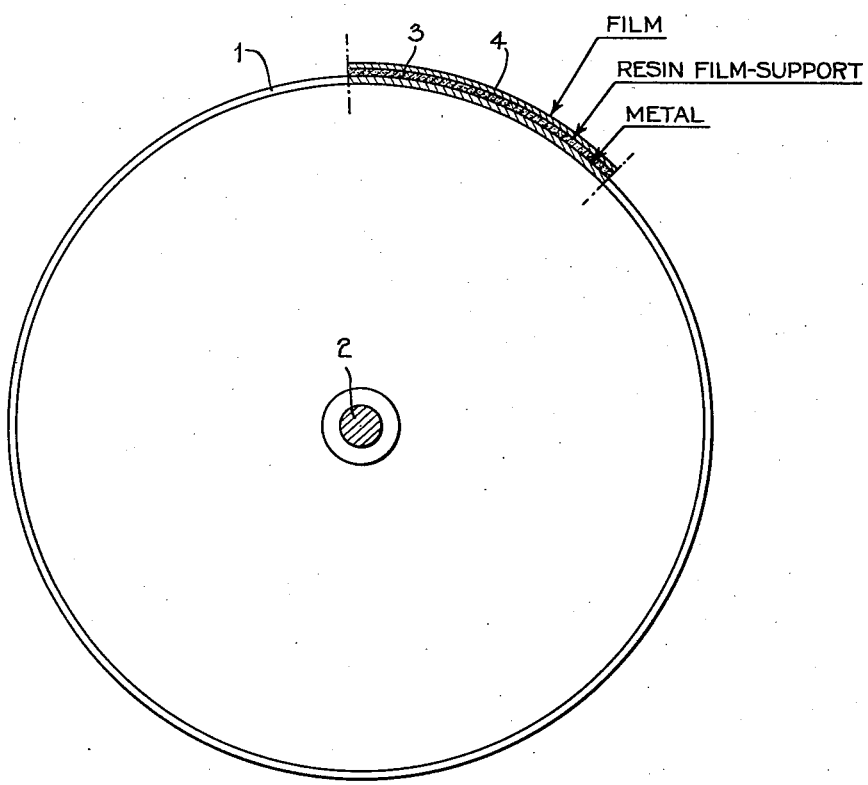
INVENTOR
George Schneider
BY
ATTORNEYS Patented Nov. 20, 1934

1,981,472

UNITED STATES PATENT OFFICE 1,981,472

APPARATUS FOR MAKING FILMS, FOILS, AND THE LIKE

George Schneider, Montclair, N. J., assignor to Celanese Corporation of America, a corporation of Delaware Application January 28, 1930, Serial No. 424,139

7 Claims. (Cl. 18—15)

This invention relates to a novel process of producing films, foils and the like of cellulose and/or its derivatives and to the improved films and foils produced thereby.

An object of my invention is to produce films and foils of cellulose and its derivatives wherein non-metallic supports are utilized for the film formation.

Another object of my invention is to devise a process of producing films, foils, etc. by employing synthetic resins as the support upon which the films are cast or formed.

Still another object of my invention is to produce films, foils, etc. which are free of all traces of metal.

Other objects and advantages of the invention will appear hereinafter in the detailed description and the claims.

The production of films from cellulose derivatives such as cellulose esters (cellulose nitrate, cellulose acetate, cellulose propionate, etc.) and cellulose ethers (methyl cellulose, ethyl cellulose, etc.) has long been known. The processes employed hertofore for the manufacture of these films have necessitated the use of a metal base or support upon which the film forming solution is cast, poured or spread. This metal base or support, when a continuous film is desired, sometimes is in the form of a large highly polished wheel and sometimes is in the form of an endless, polished, flexible, metal or metal covered belt or ribbon. When sheets of film are desired highly polished plates or slabs of metal are employed.

The films produced when employing such metallic surfaces for the film base or support are unsatisfactory for many purposes due to the fact that the films when they are separated from the metallic support have adherent, microscopic particles of metal. This defect renders the film particularly unsuitable for photographic purposes.

The old process of producing films is also costly as well as disadvantageous. The cost of preparing and maintaining the extensively highly polished surfaces as of nickel, for example, is very high. These highly polished metal surfaces are very sensitive to corrosion by the film forming solutions, necessitating frequent refurbishing and/or renewals. This corrosion is perhaps caused in part by the mechanical removal of minute particles by the film when the latter is separated from the support and in part by some galvanic action set up between the film forming solution or its impurities and the metallic base or support.

I have now found that these difficulties can be overcome by employing as the film base or support a synthetic resin or synthetic resins. This not only results in a substantial decrease in the cost of film manufactured but also yields films which are superior to the films heretofore produced.

In the accompanying drawing the figure represents a rotatable drum, with a portion of the drum shown in enlarged section, illustrating the present invention. In the Figure 1 designates a drum of any suitable metal which is adapted to be rotated on the shaft 2. The metal surface of the drum 1 is covered with a layer or coating, 3, of a synthetic resin, which resin layer acts as a support for the film 4 which is deposited or cast thereon.

The resin film support or base may be produced by applying to the polished wheel or other metallic support a comparatively thin layer of a solution of the desired resin. This wheel or belt or other material coated with the resin is then baked at any suitable temperature, until the resin is rendered insoluble and infusible. The duration of the baking treatment will of course depend upon the temperature employed.

Where desired the resin solution may be applied in a comparatively thick layer and while the latter is still plastic, the surface may be modified so as to give any desired design. The resin is then baked to render the same insoluble and infusible. By employing this modification it is possible to cast film or sheets with any desired design, thereby eliminating the usual added step of embossing such films when figured films or sheets are desired. In like manner the resin support may have imparted to it a surface of such nature that the resultant film or sheet is translucent but not transparent. Also where desired, particularly in the production of discontinuous sheets, the film support may consist entirely of resin, thereby dispensing with the need for a metallic or other support for the resin.

In accordance with my invention the film forming solution is poured or otherwise deposited on a smooth surface of a synthetic resin which is insoluble in and/or unaffected by the solvent or solvents present in the film forming solution. Thus where the film is formed on a wheel, the latter instead of being polished, then copper plated and then nickel plated, would merely be polished and then coated with a resin which is baked on until it is infusible and insoluble. In like manner where the film is formed on an endless, flexible, metallic belt or on a flat discontinuous surface the metal surface would be polished and then coated with a suitable resin, thereby dispensing with the two complicated and costly plating operations and the polishing or buffing of the plated surfaces also be eliminated. Not only is the preparation of the film support rendered more economical and rapid but the film produced when using my novel film support is of superior quality. It is highly satisfactory for photographic purposes being eminently superior, in this respect, to film heretofore produced. It is entirely free of all traces of metal, the presence of which, in film produced in the ordinary manner, is evidenced by the appearance of "photographic spots" in the film. This metal is mechanically removed from the film support when the film is separated therefrom and particularly when the plated metal surface corrodes, which invariably takes place after the particular metal film support has been in use for a comparatively short period of time.

As resins suitable for use in my novel process I have found the phenol-aldehyde, urea-aldehyde, diphenylol-propane-aldehyde, phenol-furfural, aryl sulfonamide-aldehyde and other synthetic resins which can be rendered insoluble and/or infusible by baking or any other means. My invention however is not limited to any particular synthetic resin or group of resins. Any synthetic resin which will yield a smooth, tough and hard surface and which will be unaffected by the solvent or solvents or other ingredients present in the film forming solution can be employed. Preferably the resin employed for the film support should contain no softener or plastifier since the latter might be deleteriously affected by the film forming solution.

The solvents usually employed in the manufacture of films from cellulose derivatives are acetone, either alone or mixed with water and/or alcohol; butyl acetate, with or without alcohol; ether alcohol mixtures with or without water; methyl and ethyl acetate, alone or mixed with each other or with water and alcohol. By careful selection a resin may be utilized for the film support which will be insoluble in all or most of these solvents. In any event it is always possible to select a synthetic resin which will be unaffected by any particular solvent mixture. The fact that the film forming solution may also contain some plastifier should present no difficulties since a synthetic resin may be chosen which will be unaffected by the specific plastifier.

By my process any desired thickness of film may be produced with equally good results. I have made foils of .001 to .0005 inch thickness as well as films of greater thickness .020 inch for example. In all cases the films were very easily stripped or separated from the resin film support even though they were smoothly and firmly adherent to the support until stripped. This was true where the film was formed on a resin coated wheel or a resin coated endless belt or on slabs of metal coated with resin.

The term "films" as used in the claims includes within its scope foils as well as films and sheets. The term "cellulose derivative" is used in the claims to include the cellulose esters such as cellulose nitrate, cellulose acetate, cellulose propionate, etc., the cellulose ethers such as methyl cellulose, ethyl cellulose, etc. as well as the other organic substitution derivatives of cellulose.

Having described my invention, what I desire to secure by Letters Patent is:

1. A support for forming films, the film forming surface of which consists substantially of a synthetic resin.

2. A support for forming films, the film forming surface of which consists substantially of an insoluble synthetic resin.

3. A support for forming films, the film forming surface of which consists substantially of a phenol-aldehyde resin.

4. A support for forming films, the film forming surface of which consists substantially of an insoluble and infusible phenol-formaldehyde resin.

5. A metallic support for forming films, the film forming surface of which consists substantially of a synthetic resin.

6. A flexible metallic support for forming films, the film forming surface of which consists substantially of an insoluble synthetic resin.

7. A flexible metallic support for forming films, the film forming surface of which consists substantially of an insoluble and infusible phenol-formaldehyde resin.

GEORGE SCHNEIDER.